Dec. 10, 1968  I. A. HADDAD  3,415,730
FLEXIBLE ELECTRODE ASSEMBLY
Filed Nov. 16, 1965  2 Sheets-Sheet 1
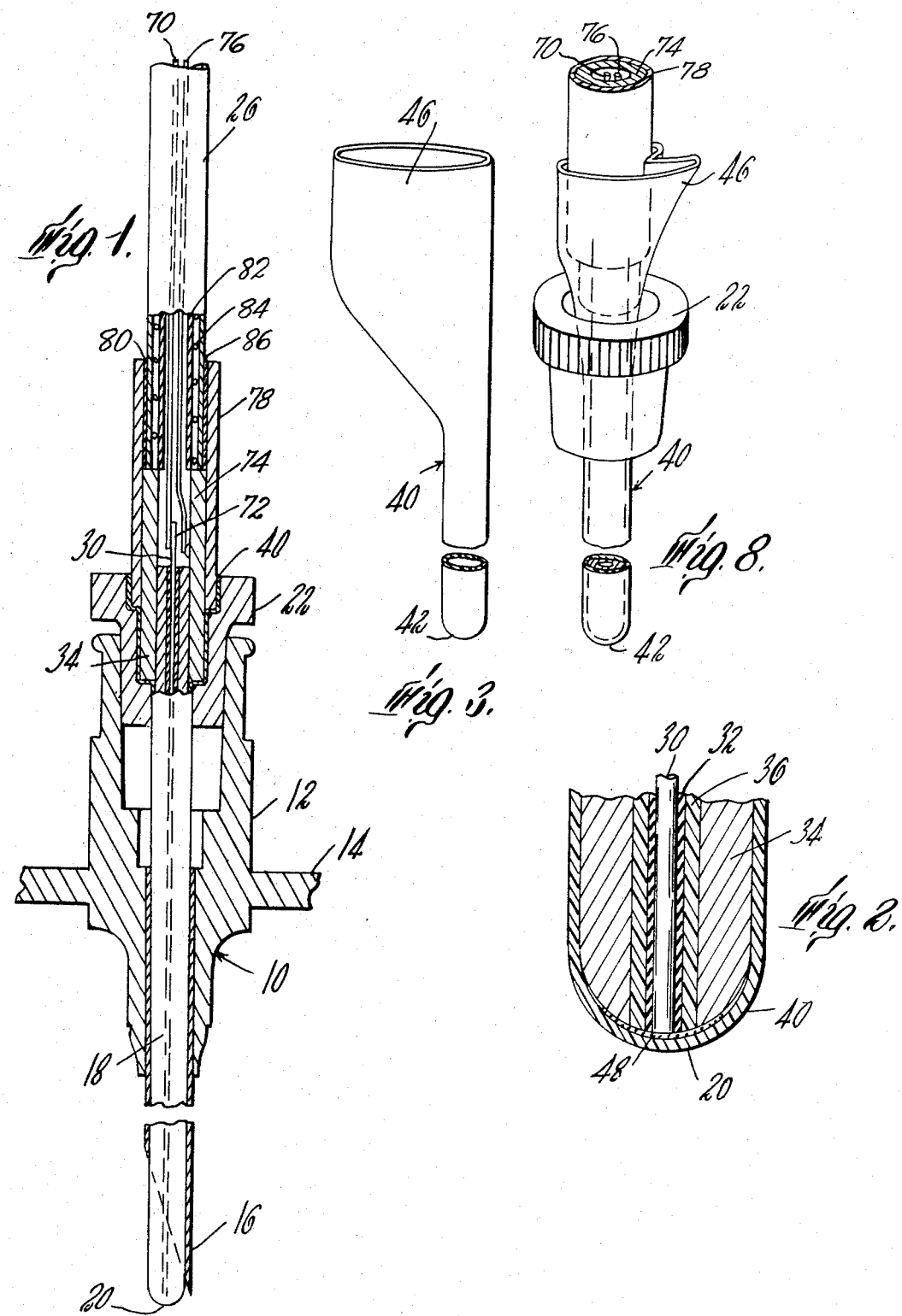

Dec. 10, 1968   I. A. HADDAD   3,415,730
FLEXIBLE ELECTRODE ASSEMBLY
Filed Nov. 16, 1965   2 Sheets-Sheet 2
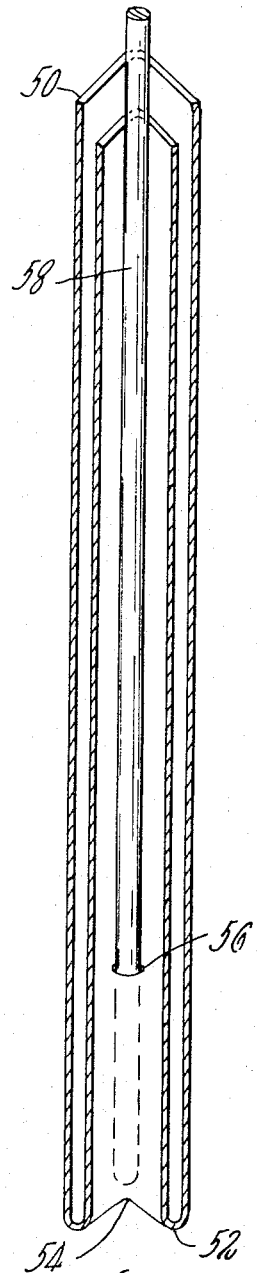
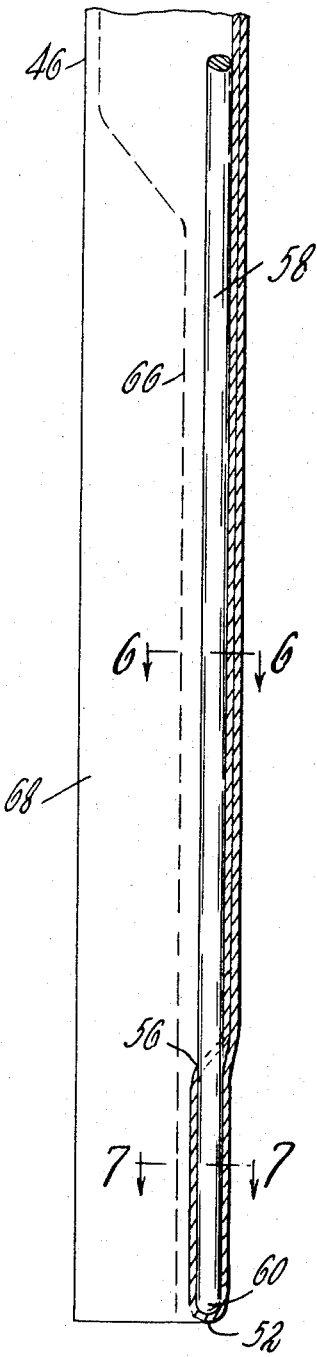
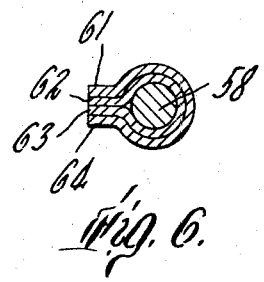
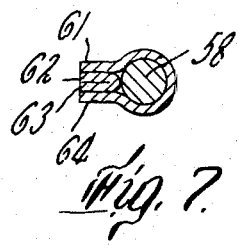

United States Patent Office 3,415,730
Patented Dec. 10, 1968

3,415,730
FLEXIBLE ELECTRODE ASSEMBLY
Ihsan A. Haddad, Brighton, Mass., assignor to Instrumentation Laboratory, Inc., a corporation of Massachusetts
Filed Nov. 16, 1965, Ser. No. 508,087
18 Claims. (Cl. 204—195)

This invention relates to electrode assemblies of the type that employ a protective membrane, such as a polarographic electrode assembly which provides direct measurement of the proportional quantity of a substance in a composition of matter.

Polarographic analysis apparatus employs a pair of spaced electrodes that are connected by means of an electrolyte medium. The electric circuit parameters of this apparatus change when exposed to different materials, as for example, oxygen in blood when passing into the electrolyte provides an increase in the current flow in the circuit between the two electrodes. Typically a protective membrane is positioned over the cathode to maintain the electrolyte in position. Such a membrane is selectively permeable so that it passes substances of interest while blocking other substances that might interfere with or be detrimental to the measuring operations.

The polarographic response of the membrane covered electrode has typically been very sensitive both to stresses on the membrane and to the thickness of the membrane. Also the configuration of such an assembly is frequently critical in dimension. Further, miniaturized electrode assemblies of this type have been difficult to clean adequately and usually have required disassembly of the membrane and removal of the electrolyte to insure proper cleanliness.

It is an object of this invention to provide a novel and improved miniature electrode assembly of the type that employs a membrane to protect a sensitive electrode element.

Another object of the invention is to provide novel and improved methods of manufacturing such electrode assemblies.

Another object of the invention is to provide a novel and improved electrode assembly employing a membrane protecting an electrolyte bridge.

Another object of the invention is to provide a novel and improved electrode assembly in which the securing of a membrane thereon is simplified.

Still another object of the invention is to provide an elongated, flexible electrode assembly of the miniaturized type.

A further object of the invention is to provide a novel and improved polarographic electrode assembly particularly adapted for use in a hypodermic needle or catheter or the like.

In accordance with the invention, there is provided an electrode assembly including a first elongated flexible electrode element and a second elongated flexible electrode element disposed parallel to and of substantially the same length as the first electrode element with one end of the second electrode element aligned with one end of the first electrode element. Electrical insulation is disposed between the two electrode elements so that they are electrically insulated. The electrode elements are arranged so that an electrolyte medium bridging the insulation at the sensing ends of the pair of electrodes provides an electrically conductive path between the two electrode elements. A sleeve of selectively permeable material, one end of which is closed, is disposed over the electrode assembly with the inner surface of the sleeve firmly engaged with the outer surface of an electrode element and the closed end of the sleeve closely adjacent the sensing end of an electrode element to maintain the integrity of that element. In the preferred embodiment, firm frictional engagement of the sleeve with a substantial length of axial surface of the electrode assembly secures that sleeve in position. In that embodiment the membrane material has shrinkable characteristics and during assembly the membrane is shrunk into position in a manner to provide a uniform stress on the membrane sheath.

This construction is particularly useful in polarographic and pH electrode assemblies of the type for insertion in a hypodermic needle or in a catheter for use in in vivo measurements, as for example, for insertion directly in the blood stream. An assembly constructed in accordance with the invention is in the form of an elongated flexible needle which may be subjected to substantial bending stress without significantly affecting the calibration of the electrode assembly. The membrane is firmly secured in position so there is substantially no risk of the membrane being displaced while it is positioned in a blood stream. Also, the flexibility of such an electrode assembly enables it to be inserted a substantial distance through a blood vessel, including bends around relatively sharp corners, to reach the location desired to be analyzed or supervised. Further, the electrode assembly may be easily cleaned without necessarily removing the membrane.

Other objects, features and advantages of the invention will be seen as the following description of a particular embodiment progresses in conjunction with the drawings in which:

FIGURE 1 is a sectional view of a particular embodiment of the electrode assembly of the invention positioned within a hypodermic needle structure;

FIGURE 2 is an enlarged section view of the tip of electrode assembly in the embodiment shown in FIGURE 1;

FIGURE 3 is a perspective view of the membrane sheath;

FIGURE 4 is a diagram indicating a step in the formation of the membrane sheath;

FIGURE 5 is an enlarged sectional view of the membrane sheath in process of sealing;

FIGURES 6 and 7 are sectional views taken along the lines 6—6 and 7—7 of FIGURE 5 respectively; and FIGURE 8 is a perspective view of the sheath being assembled on the tubular electrode assembly.

The electrode assembly is shown in FIGURE 1 as installed in a conventional Riley needle 10. It will be understood that the electrode assembly may be utilized in connection with a catheter or other types of needles and is not limited to a particular type of support apparatus. For example, where a suitable skin puncture hole is provided, no support structure is necessary. The needle shown in FIGURE 1 includes a body 12 having a flange 14 and a hollow pointed tube 16. The electrode assembly 18 is positioned within the tube 16 with the tip 20 exposed at the end of the needle tube 16. It is preferable that the electrode tip 20 extend beyond the end of the needle tube 16 so that there may be no interference between the tip of tube 16 and the tip of the electrode exposed to the material to be analyzed. The needle structure includes a fitting 22 which is received in an end section of the needle body 10 extending above the fitting 22 as a cable 26 for connection to external measuring indicator apparatus. A Y adapter (not shown) may be inserted between needle body 12 and fitting 22 for such purposes as sample withdrawal or pressure monitoring if desired.

The electrode assembly as shown in greater detail in FIGURE 2 includes a central electrode conductor 30 which serves as a sensing electrode element. This conductor is a suitable electrical conductor or semi-conductor material and in this particular embodiment is a gold wire 0.002″ in diameter. Disposed on the gold wire 30 is electrically insulating coating such as Isonel or silicone material 32 in the order of 0.0005″ in thickness to provide an insulation resistance in excess of $10^{13}$ ohms. This coated structure can be flexed to a radius of one inch without impairment of its electrical insulation or conduction characteristics. Surrounding the center conductor 30 is a reference electrode in the form of a tubular element 34 of suitable electrically conductive material. This particular reference electrode is stainless steel hypodermic needle tubing of 0.005″ inner diameter and 0.014″ outer diameter. The space between the insulated sensing electrode 30 and the reference electrode 34 is filled with a suitable stabilizing material such as an epoxy resin 36. The tip 20 of this electrode assembly as best shown in FIGURE 2 is generally spherical in configuration.

Disposed over the electrode assembly is a tubular sheath or sleeve 40, having a closed end 42 and a tubular length 44 of substantially uniform diameter and a funnel-shaped upper end 46. The material of the sleeve is selected in accordance with the nature of the material to be analyzed. In this embodiment, the sleeve material is bi-oriented polypropylene, 0.0005″ in thickness, which is a suitable material for use in determining the oxygen content of blood. The formation of the sheath is indicated in FIGURES 3–7. A sheet of membrane material 50 is folded as indicated in FIGURE 3 approximately in half along fold line 52 and then in quarters along a fold line 54 to form four overlying layers 61–64 of membrane. A puncture is made at point 56 and a rod like mandrel 58 is inserted to the folded membrane in a position to lie parallel to the fold lines 54 with the tip 60 of the mandrel passing through the aperture 56 so that it is seated against the fold line 52 as indicated in FIGURE 5. The four layers of membrane are sealed through the application of heat along the dashed line indicated at 66 to provide a seam that secures the layers 61–64 together (although not necessarily a continuous seam) and an enlarged funnel portion 46 at the top. The portion 68 of the membrane beyond the seal line is severed and discarded. The resulting sheath 40 has a single thickness of material at tip 42 and is of double wall thickness along its remaining length. The funnel portion 46 is preferably formed to provide a larger opening of the sheath and facilitate the insertion of the electrode assembly into the sheath. After the heat sealing operation has been completed, the mandrel 50 is withdrawn and the membrane is ready for electrode assembly insertion. The electrode assembly occupies the same position as the mandrel as indicated in FIGURES 6 and 7.

Disposed between the sleeve 40 and the tip of a sensing electrode 30 is an electrolyte medium 48, with the sleeve 40 serving to maintain the electrolyte 48 in bridging relationship between the cathode (sensing) electrode 30 and the anode (reference) electrode 34. The sleeve is shrunk after it is positioned over the reference electrode so that the closed end 42 surrounds and is firmly secured over the tip 20 of the electrode assembly and the tubular length extends along the electrode body.

The particular electrolyte 48 utilized in the assembly typically is a function of the electrode materials and the particular constituent to be subjected to analysis. In an embodiment utilized for oxygen measurement, a suitable electrolyte is a solution which may be unbuffered or buffered to a suitable pH value such as in the range 6.5–7.0 of a salt, such as sodium chloride or potassium chloride, which is gelled utilizing a methylcellulose thickening agent (Methocel). Additives such as a rust inhibitor such as sodium nitrite, a fungicide such as thymol and/or a bacteriacide such as zepherin chloride may also be included. Other suitable electrolytes include a salt solution in combination with an organic such as glycerol. In $CO_2$ measurements the electrolyte may include quinhydrone in combination with silver and gold electrode elements and an ion impermeable membrane. An ion permeable membrane such as cellophane may also be used if desired to increase the response speed of the electrode assembly. Other suitable combinations of electrodes and electrolytes are well known to those skilled in the art.

In the manufacture of the electrode assembly, the insulated gold wire 30 is threaded (either by pulling or pushing) through the conductive stainless steel tubing 34 so that it is positioned therein with its ends protruding from either end. At the tip 20, the end of the gold wire is cut off so that it is flush with the end of the stainless steel tubing 34. The space between the conductor 30 and the tube 34 is filled with a suitable adhesive or bonding agent such as an epoxy resin 36 to secure the electrode components in the desired relation. It is preferable but not necessary that the bonding agent have electrical insulation qualities.

A sturdier conductor (such as No. 32 electrically insulated magnet wire 70) is connected to the sensing conductor 30 by conventional techniques at joint 72. A silver sleeve 74 is positioned over the reference electrode tubing 34 and secured in electrically conductive relation thereto by silver solder. A conductor 76 (which may be the same as conductor 70) is in turn soldered to the sleeve 74 to provide an electrical connection to the reference electrode structure. Disposed over the silver sleeve 74 is a second sleeve 78 which increases the structural strength of the assembly and forms a recess 80 in which insulation, shielding and termination provisions may be made for the cable 26. That cable houses the two conductors 70, 76 and includes a fibreglass wound sleeve 82 as an inner structural member which is surrounded by a spiral wound stainless steel wire 84 that serves as a shield against static electricity. A moisture barrier in the form of a shrinkable irradiated polyvinylchloride tube 86 is disposed over the shield 84 and the structural sheath 82, and the recess 80 between tube 86 and sleeve 78 is filled with suitable sealing material to complete the moisture seal to the interior of the electrode assembly.

The tip 20 of the assembly is dipped in the gelled electrolyte medium so that the electrolyte 42 covers the tip and extends along the axial length of tube 34 a distance in the order of one-half inch. This tip is then inserted into the open end 46 of the membrane sheath 40 and slid down the length of it so that the funnel portion 46 surrounds sleeve 78. At this point, the closed end 42 is seated on tip 20. During this operation, an electric potential may be applied across the conductors 70, 76 and the magnitude of electric current flowing through the electrolyte 48 measured. The magnitude of the electric current (a typical value being in the order of $10^{-7}$ amperes) indicates the continued integrity of the electrolyte. When the sheath end 42 is seated on the tip 20, the funnel portion 46 is folded as indicated in FIGURE 8, and the fitting 22 is slid over the sheath and encased needle and then rotated to encase the funnel portion smoothly and clamp the entire sheath in position.

This fitting 22 holds the membrane sheath 40 in position and is used primarily to prevent lengthwise shrinkage of the sheath during subsequent treatment. The assembly of electrode and sheath is then autoclaved in a moisture-containing atmosphere at a temperature on the order of 250–300° F. This treatment causes the sheath material 40 to shrink about the electrode and be placed in tension stress so that it and the electrode are firmly secured together by frictional engagement over substantially the entire length of the sheath. After the sheath has been shrunk into place, the fitting 22 may be removed. However, since the fitting does facilitate handling all of the completed electrode assembly and also, when used in the needle as indicated in FIGURE 1, the fitting secures and positions the electrode assembly properly in the surrounding needle support.

An elongated needle four inches in length constructed as above described can be bent in a semi-circle (about a 1″ radius) while maintaining its original calibration within 10%. The shrunken sheath 40 is maintained under stress such that possible changes in thickness and/or stress conditions at the membrane as the assembly is flexed are minimized. Obviously, the sheath may be formed in a variety of manners along the lines indicated above, including the provisions of two or more thicknesses of membrane material at the closed end of the sheath, such being achieved merely by modifying the folding of the sheet of membrane material.

While a particular embodiment of the invention has been shown and described, various modifications thereof will be obvious to those skilled in the art and, therefore, it is not intended that this invention be limited to the disclosed embodiment or to details thereof and departures may be made therefrom within the spirit and scope of the invention as defined in the claims.

What is claimed is:

1. An elongated flexible electrode assembly comprising a first elongated flexible electrode element, a second elongated flexible electrode element disposed parallel to said first electrode element with one end of said second electrode element being adjacent one end of said first electrode element, electrical insulation disposed between said first and second electrode elements, and a sheath of membrane material having a closed end disposed over said electrode elements with the closed end of said sheath closely adjacent said one end of an electrode element and said sheath being secured on said electrode elements with the inner surface of the said sheath firmly engaged with the outer surface of an electrode element so that said sheath protects said electrode elements from contaminants, said electrode assembly being flexible as an assembly over a substantial portion of its length.

2. The electrode assembly as claimed in claim 1 wherein said sheath extends over the entire flexible length of said electrode elements.

3. The electrode assembly as claimed in claim 1 wherein said sheath is of shrinkable material and is in tension stress in position over said electrode elements.

4. The electrode assembly as claimed in claim 1 and further including an electrolyte medium in gel form bridging said electrical insulation at said one end.

5. The electrode assembly as claimed in claim 1 wherein said second electrode is substantially the same length as said first electrode element and further including a tubular fitting disposed over the other ends of said electrodes, a pair of flexible electrical conductors and electrical connections between said electrical conductors and said electrodes within said tubular fitting.

6. The electrode assembly as claimed in claim 5 and further including a static electricity shield and a moisture barrier disposed over electrical conductors and secured to said tubular fitting.

7. The electrode assembly as claimed in claim 1 wherein said first electrode element is a tubular member of uniform cross sectional configuration over its entire flexible length and said second electrode element is disposed coaxially within said first electrode element.

8. The electrode assembly as claimed in claim 7 wherein said sheath extends over the entire flexible length of said electrode elements.

9. The electrode assembly as claimed in claim 8 wherein said sheath is of shrinkable material and is in tension stress in position over said electrode elements.

10. The electrode assembly as claimed in claim 9 wherein said second electrode is substantially the same length as said first electrode element and further including a tubular fitting disposed over the other ends of said electrodes, a pair of flexible electrical conductors and electrical connections between said electrical conductors and said electrodes within said tubular fitting.

11. The electrode assembly as claimed in claim 10 and further including a static electricity shield and a moisture barrier disposed over electrical conductors and secured to said tubular fitting.

12. The electrode assembly as claimed in claim 11 and further including an electrolyte medium in gel form bridging said electrical insulation at said one end.

13. The method of manufacturing an electrode assembly comprising the steps of disposing a first elongated flexible electrode element and a second elongated flexible tubular electrode element in parallel relation to form an electrode assembly with the tip of said first electrode element exposed adjacent the end of said second electrode element, placing an electrolyte medium in contact with said tip of said first electrode element and said end of said second electrode element, inserting said electrode assembly into a sheath of membrane material, and shrinking said sheath so that said sheath is frictionally secured to the outer surface of an electrode element over a substantial length thereof.

14. The method as claimed in claim 13 wherein said electrolyte medium is placed on said electrode elements by dipping said electrode assembly in a gelled salt solution.

15. The method as claimed in claim 13 wherein said sheath is shrunk by means of application of heat.

16. The method as claimed in claim 15 wherein said electrolyte medium is placed on said electrode elements by dipping said electrode assembly in a gelled salt solution.

17. The method of manufacturing a membrane sheath for an electrode assembly comprising the steps of folding a sheet of membrane material along a first fold line to form two overlying layers of membrane material, inserting a mandrel between said layers with an end thereof closely adjacent said fold line, and sealing said layers of membrane material together to form the sheath.

18. The method as claimed in claim 17 further including the steps of folding said sheet along a second fold line that intersects said first fold line to form four overlying layers of membrane material, and puncturing the sheet of membrane to form a hole in said second fold line at a point spaced from the intersection of the two fold lines, said mandrel being inserted through said hole to lie parallel to and closely adjacent said second fold line.

References Cited

UNITED STATES PATENTS

| | | | |
|---|---|---|---|
| 3,098,813 | 7/1963 | Beebe et al. | 204—195 |
| 3,211,638 | 10/1965 | Halvorsen | 204—195 |
| 3,334,039 | 8/1967 | Vlasak | 204—195 |
| 3,334,623 | 8/1967 | Hillier et al. | 204—195 |

HOWARD S. WILLIAMS, *Primary Examiner.*

T. TUNG, *Assistant Examiner.*